United States Patent
Blasberg et al.

(10) Patent No.: US 7,156,718 B2
(45) Date of Patent: Jan. 2, 2007

(54) GENERATING METHOD AND MACHINE FOR SPIRAL BEVEL GEARS

(75) Inventors: Herbert Blasberg, Remscheid (DE); Torsten Koenig, Radevormald (DE); Karl-Martin Ribbeck, Remscheid (DE); Matthias Radermacher, Hueckeswagen (DE)

(73) Assignee: Klingelnberg GmbH, Hueckeswagen (DE)

( * ) Notice: Subject to any disclaimer, the term of this patent is extended or adjusted under 35 U.S.C. 154(b) by 213 days.

(21) Appl. No.: 10/837,949

(22) Filed: May 3, 2004

(65) Prior Publication Data

US 2005/0064794 A1    Mar. 24, 2005

(30) Foreign Application Priority Data

Sep. 23, 2003   (DE) ................. 103 43 854

(51) Int. Cl.
*B24B 51/00* (2006.01)
*B23F 19/05* (2006.01)

(52) U.S. Cl. ............................ 451/5; 451/47
(58) Field of Classification Search ............ 451/5, 451/8, 47, 147, 161, 219, 253; 409/10–13, 409/25–27
See application file for complete search history.

(56) References Cited

U.S. PATENT DOCUMENTS

| 3,583,278 | A |   | 6/1971  | Baxter et al. ............... 90/5 |
| 3,916,569 | A | * | 11/1975 | Wydler et al. ............. 451/5 |
| 5,310,295 | A |   | 5/1994  | Palmateer, Jr et al. |
| 5,716,174 | A | * | 2/1998  | Stadtfeld et al. ............. 409/26 |
| 5,765,974 | A | * | 6/1998  | Faulstich ...................... 409/51 |
| 5,961,260 | A | * | 10/1999 | Kasler et al. ................. 409/25 |
| 6,050,883 | A | * | 4/2000  | Wiener ........................ 451/47 |

FOREIGN PATENT DOCUMENTS

| DE | 1952025     | 4/1970 |
| DE | 2006752     | 9/1971 |
| DE | 19646189 A1 | 5/1998 |
| GB | 1106149     | 3/1968 |

OTHER PUBLICATIONS

European Search Report No. EP 04 01 9896 dated Jan. 14, 2005.

* cited by examiner

*Primary Examiner*—Hadi Shakeri
(74) *Attorney, Agent, or Firm*—McCormick, Paulding & Huber LLP

(57) ABSTRACT

In a method and apparatus for machining spiral bevel gears a rotationally symmetric tool is driven about its axis of rotation as it is moved, along with a workpiece, into a respective initial starting position. The workpiece is rotated about one tooth index, and a complete tooth space is processed via a generating method to a preset generating depth. The tool and workpiece each reach first end roll positions and are then moved into respective second starting positions near the previously reached end roll position. The workpiece is once again rotated about a tooth index and another complete tooth space is generated using a roll direction reversed relative to the initial tooth generating process. The tool and workpiece reach a second end roll position near the first start position and these steps are repeated until all the tooth spaces of the workpiece have been processed.

6 Claims, 4 Drawing Sheets

US 7,156,718 B2

GENERATING METHOD AND MACHINE FOR SPIRAL BEVEL GEARS

CROSS-REFERENCE TO RELATED APPLICATIONS

The present patent application claims priority to German Patent Application DE 103 43 854.8, which was filed on 23 Sep. 2003 and is currently assigned to the applicant of the present application and is hereby incorporated in its entirety by reference.

FIELD OF THE INVENTION

The present invention relates generally to a method and apparatus for generating milling or generating grinding, spiral bevel gears.

BACKGROUND OF THE INVENTION

As used herein, the term "spiral bevel gears" is to be construed to include both non-axially-offset and axially-offset bevel gears. If one wishes to differentiate between the two types, the axially-offset bevel gears are referred to as hypoid gears.

Generally, there are two production processes for spiral bevel gears. In one case, tooth spaces of a pinion and ring gear of a bevel gear pair are each produced in generating processes, in the other case, the tooth spaces of the ring gear are only produced by plunging the rotating cutter head into the stationary workpiece, while in contrast the pinion gaps are produced in a special generating process using a tilted cutter head. In both cases, the generating process is based on an imaginary producer gear, which executes a generating movement with the workpiece during the processing in the gear cutting machine. In the first case, the producer gear is a flat toothed disk, in the second case, it corresponds to the mating gear, the ring gear produced in the plunging process.

This second production process was mainly developed for the automobile industry in order to save processing time. In comparison to a plunging process, a generating process takes significantly longer, production time adds up over the many teeth that must be produced for a ring gear. One reason for the longer generating time is the lower processing volume per tool rotation, another reason is the longer idle time which the tool requires in spite of rapid motion in order to come from one final roll position back into the initial roll position for the next tooth space. This is because, according to the related art, the generating process for each tooth space of a gear is always performed in the same direction for all spiral bevel gears produced through generating. The background for this is the influence of different resultant deflections which the gear cutting machine would be subject to as a function of the cutting process and therefore in the event of alternating rolling directions. On the workpiece, changing resultant deflections lead to indexing errors and to different shape deviations of the flank topography, depending on the direction of roll.

A method for grinding spiral bevel gears in the single-indexing generating method, in which one flank is machined in a downward generating motion to a first reversal point and the other flank of the same tooth space is machined in an upward generating motion to a second reversal point, is known from DE 195 17 360 C1. In this case, downward generating means the roll direction in which the tool moves from the top toward the bottom on a path shaped like a circular arc during the generating process, and upward generating means the corresponding reversed roll direction. However, idle times are not shortened using this generating method, rather, it is important in this case that during the generating process, in spite of the different bevel angles on the grinding wheel, a correct pressure angle and a correct topography arise on both tooth flanks.

In addition, applying the double-roll method during generating of spiral bevel gears is also known. In this case, the cutter head is plunged into the workpiece in a middle roll position in order to remove a large amount of material from the tooth space in a short time, but without reaching the final generating depth. An upward generating motion with chip removal then follows on one tooth flank and then a further infeed in order to reach the final generating depth and the initial roll position. From here, both tooth flanks are now produced through downward generating. This procedure is repeated for each tooth space, so that finally all gaps are manufactured in the same g roll direction, however.

For the generating process for spiral bevel gears, in the Gear Handbook, FIG. 20-2 and FIG. 20-7, machines which operate purely mechanically are described, a generating machine (generator) having a generating drum or cradle and a separate mechanism for tilting the cutter head. In contrast, modern CNC machines for milling or grinding spiral bevel gears, as are described, for example, in DE 196 46 189 C2 or in DE 37 52 009 T2, may achieve this without a generating drum and without a tilt mechanism, solely through spatial motions of the tool carrier and workpiece carrier. For the face-milling method with single-indexing, only five controlled axes are necessary for this purpose, three translational and two rotational. The missing sixth degree of freedom for the general position of a rigid body in space, in this case the cutter head in relation to the workpiece, is the rotation of the cutter head around its rotational axis. It is not necessary as a controlled axis in the face-milling method with single-indexing, because the cutter head is rotationally symmetric and its drive—independently of the other five axes—is only necessary to achieve a desired cutting speed.

Such CNC machines achieve significantly greater operating speeds than purely mechanical bevel gear cutting machines, while simultaneously having more precise setting and travel motions, and are therefore more cost-effective. Nonetheless, the automobile industry requires that the processing times per workpiece be shortened further in order to be able to reduce costs.

Therefore, it is the object of the present invention to implement a method and a machine of the type initially cited in such a way that spiral bevel gears which are produced in the face-milling method with single-indexing may be machined in a shorter time through a generating process than previously, without having to accept noticeable reductions in the precision of the tooth spaces at the same time.

SUMMARY OF THE INVENTION

The present invention resides in one aspect in a method for machining spiral bevel gears using a rotationally symmetric tool. The tool is driven around its axis of rotation and is moved along with the workpiece into a respective initial starting position. The workpiece is rotated around one tooth index and the complete tooth space is processed via a generating process to a preset generating depth. The tool and workpiece each reach a first end roll position and subsequent thereto the tool and the workpiece are moved into their respective second starting positions which is near the previously reached first end roll position. The workpiece is then once again rotated around a tooth index with another tooth space being completed through the generating process using a roll direction reversed in relation to the initial first tooth generating process. The tool and the workpiece similarly reach a second end roll position near the first start position. These steps are repeated until all the tooth spaces of the workpiece have been processed.

The present invention resides in a second aspect to an apparatus for machining spiral bevel gears using a single indexing method. The apparatus includes a drive motor for rotating a tool around its axis of rotation. A first device is provided for moving the tool and the workpiece together into their particular first start positions is provided as is a second device for rotating the workpiece around one tooth index. A third device is also provided for processing a complete tooth space through the generating process, the rotating tool and the workpiece each reached a first end roll position which once achieved, the third apparatus returns the tool and the workpiece to their start positions. A CNC controller is provided and has control means for the third device which are implemented in such a way that the tool and the workpiece are each moveable into a second start position near the previously reached first end roll position. Following an indexing procedure a complete tooth space may be processed in a generating process using the reverse roll direction, the tool and the workpiece each reach a second end roll position near the first start position.

This object is achieved according to present invention by a method having the altered method steps specified in claim 1 and/or by a machine having the altered control means specified in claim 6.

The advantage of the present invention based on these two alterations is more efficient processing of rolled spiral bevel gears. Until now, each tooth space of a workpiece was manufactured in only one roll direction and the workpiece had to be returned back into the starting position for the next tooth space without chip removal, i.e., in idle state. According to the present invention, the second tooth space is now already processed in the reversed roll direction on the return path, and when the initial position is reached again in this way, the third tooth space is being manufactured in the original roll direction.

This advantage is independent of the type of processing, whether it is generating milling using a cutter head or generating grinding using a cup-shaped grinding wheel or even another generating method. However, yet an additional advantage of the present invention is shown for generating milling, specifically that the cutter blades are uniformly loaded by the alternating generating directions, and accordingly wear more uniformly.

The generating processes may also differ in how the tool reaches the initial roll position from the particular start position. In this case, start position is to be understood as the position in which the indexing procedure is also performed without the tool colliding with the workpiece.

In one embodiment of the present invention, the particular start position is simultaneously a initial roll position, in which the workpiece has reached the generating depth provided in relation to the workpiece and a generating process may be begun. In this case, for generating milling, for example, the cutter head is located just beside the workpiece and mills a complete tooth space into the workpiece from there in a single generating process. In the generating end position reached in this case, i.e., where the last chip is removed in a generating process, the tool is still in the tooth space generated and the workpiece may not be rotated around one tooth index. In order to reach the next start position, the generating movement must be continued until the tool has completely left the tooth space. However, this may be performed in rapid motion, so that besides the savings in time, this embodiment also has the advantage that except for the generating and indexing, no other machine motions are necessary and the generating depth is also not changed for the entire workpiece.

In another embodiment, first a plunging process or a combined plunging-generating process is performed from the particular start position in the tooth space to be produced or (for grinding, for example) in an already pre-processed tooth space, through which the tool and the workpiece each reach an initial roll position in the provided generating depth. This embodiment of the present invention is advantageously used for workpieces having a larger number of teeth, in which the roll entrance and roll exit paths are larger than for pinions having a small number of teeth, which will be described more in detail later.

In a further embodiment of the method according to the present invention, before and/or during each generating process, a possibly differing influence of the associated roll direction on the precision of the workpiece is compensated for through corrected machine parameters. If, for example, the method according to the present invention is only applied for pre-processing of the tooth spaces, in order to subsequently harden and grind the bevel gear, the indexing precision is generally insufficient without correction. Two different angles of rotation during the indexing procedure for one and/or the other roll direction may then compensate for the regular deviations during the tooth indexing. The requirement for this is only an indexing measurement on a test gear from which the different angles of rotation may be determined. Care must only be taken in this case that, for bevel gears having an odd number of teeth, the first tooth space processed and the last space have the same roll direction, because of which these points must be marked at the correct time on the test gear so that no errors are made during the analysis.

In a further embodiment of the method according to the present invention, the influence of the roll direction on the flank shape of the bevel gear in particular is detected through topography measurements on representative tooth spaces of one and/or the other roll direction. This means that flank shape measurements are performed at three or four tooth spaces, distributed approximately uniformly on the bevel gear circumference, which were processed in one roll direction, and on correspondingly distributed gaps of the reverse roll direction. For this purpose, the measurement is preferably performed at measuring grid points which are equal for all flanks. Under these requirements, the measurement data of the three or four representative tooth spaces of one roll direction may be averaged and, in addition, the indexing deviations may also be determined from the topography measurements.

It is especially advantageous to perform the analysis of the measurements automatically using a computer program and to have the machine parameters for both roll directions, which may then be transferred directly to the gear cutting machine, corrected from the averaged data using additional software.

The machine according to claim 7 for performing the method according to the present invention may be either a CNC machine having a generating drum and a tilt mechanism for the tool, or even a modern 5-axis machine, as was already described above. In the first case, the three devices from the preamble, using which the typical method steps are performed, may also be differentiated between on the basis of the moving axes. In the second case, a 5-axis machine, this is not possible without something further. All five axes move simultaneously here during the three method steps of a processing cycle, but in accordance with different control programs, which may also be assigned to the three devices. In both cases, the machine according to the present invention is characterized by the altered control means of the third device.

The decisive advantage of this machine for the single-indexing method is that a tooth space in one roll direction and the next space in the reverse roll direction may be processed alternately. Therefore, there is no mere return of tool and workpiece into their start positions without removing chips. Instead, the idle times are reduced and the total time for the processing of a bevel gear is significantly less. A further, noteworthy advantage is the better usage of the tool, since an equalization of the loads of inner and outer cutting regions of the tool arises through the alternating roll directions. This causes a significantly more uniform wear of the tool, which may therefore remain in use longer.

A further embodiment of the machine according to the present invention includes an additional control means, using which a differing influence of the associated roll direction on the precision of the workpiece may be compensated for through corrected machine parameters before and/or during each generating process. In this way, the main reason that has previously obstructed alternating roll directions on a workpiece is removed. For purely mechanical gear cutting machines, such corrections of the setting parameters may not be implemented practically as a function of the alternating roll direction, this is only possible using CNC machines having a controller programmed according to the present invention and thus leads to the advantages of the present invention cited above. A further aspect is that the effects of alternating roll directions on a bevel gear require non-linear corrections over the entire generating process, which is also possible using the machine according to the present invention.

In a further embodiment of the machine, corrected machine parameters, according to which the tooth spaces may be processed depending on the roll direction, may be transmitted to the additional control means separately for each roll direction. This embodiment of the machine provides the very important advantage that the method according to the present invention is also usable cost-effectively. This is because the corrections which are necessary for the uniform precision of the bevel gears produced in this way change at least from series to series, sometimes even from tool grinding to tool grinding of the tool, and must therefore be able to be determined and taken into consideration in the machine with the least possible outlay. There are already computer programs for this purpose, which automatically determine the corrected setting parameters. However, the machine must also be capable of taking the transmitted data into consideration correctly depending on the roll direction of the tooth spaces about to be processed.

BRIEF DESCRIPTION OF THE DRAWINGS

Further details of the present invention are described in greater detail in the following with reference to the drawing.

DETAILED DESCRIPTION OF THE PREFERRED EMBODIMENTS

Figure 1:
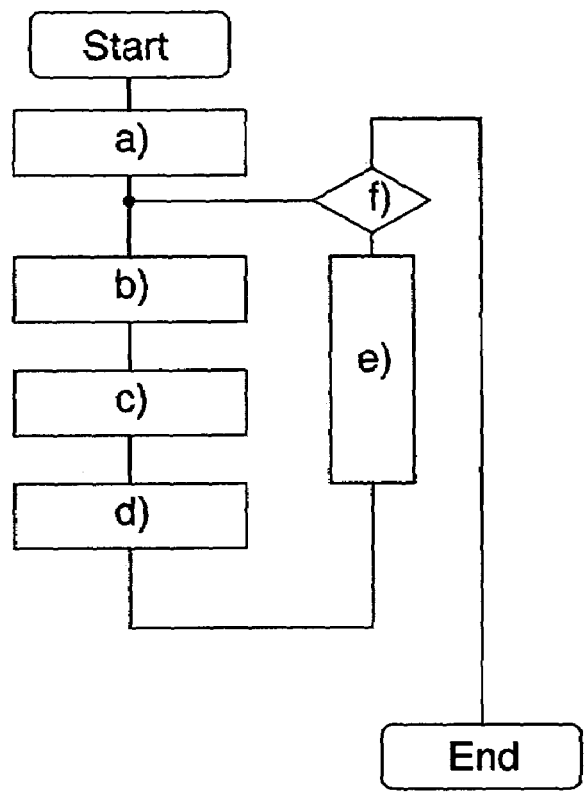
FIG. 1 shows a flowchart for the conventional generating method, always using the same roll direction.

In FIG. 1, the most important method steps for the generating according to the related art are illustrated in a flowchart. These are the driving of the tool around its axis of rotation in box a, moving the tool and a workpiece into their particular starting positions in box b, rotating the workpiece around one tooth index in box c, processing a complete tooth space through a generating process in a predetermined generating depth in box d, the tool and the workpiece each reaching a end roll position, and returning the tool and the workpiece into their starting positions in box e. The lozenge f symbolizes a branch from which the sequence jumps back to the beginning of box b until all tooth spaces of the workpiece are manufactured. The letters used for the individual steps correspond to those of the main claim for easier assignment.

Figure 2:
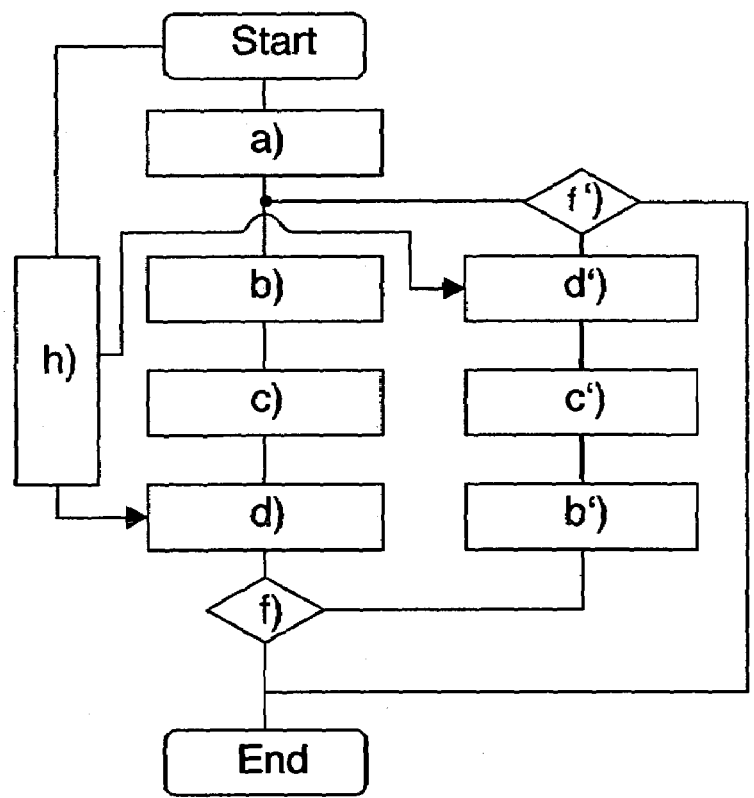
FIG. 2 shows a flowchart for the generating method according to the present invention, using alternating roll directions, FIG. 3 schematically shows the previous generating process for producing spiral bevel gears, FIG. 4 schematically shows the previous plunging-generating process for producing spiral bevel gears, FIG. 5 schematically shows the generating process for producing spiral bevel gears altered according to the present invention, FIG. 6 schematically shows the plunging-generating process for producing spiral bevel gears altered according to the present invention.

In comparison to this, FIG. 2 shows that in the flowchart for the generating method according to the present invention, box e of FIG. 1 is replaced by boxes b', c', and d'. In this case, these are the following three method steps: b'—moving the tool and the workpiece into their second starting positions near the previously reached end roll position, c'—rotating the workpiece around one tooth index, d'—processing a complete tooth space through a generating process using a roll direction reversed in relation to that of method step d, the tool and the workpiece each reaching a second end roll position near the first start position. Merely through the arrangement of the boxes in the two flow charts, the advantage that the generating process in the reverse direction has at this point over the typical return of tool and workpiece into the start positions is expressed, specifically that a complete tooth space is processed instead of a return without chip removal. The lozenges f and f' each symbolize a branch from which the sequence jumps back to the beginning of box b' and/or b until all tooth spaces of the workpiece have been manufactured. In addition, it is schematically shown in FIG. 2 how, in a method step h running in parallel, preferably corrected machine parameters of each roll direction may be provided and supplied to the associated method steps d and d'.

In the following FIGS. 3 through 6, the motions of the cutter head 7 are schematically shown. The arrows indicate relative motions of the cutter head to the workpiece. The horizontal arrows identify plunging motions and/or motions in the direction of this axis, while the vertical arrows stand for generating motions. In this case, white stands for movements in rapid motion without chip removal and black for advancing motions with chip removal.

Figure 3:
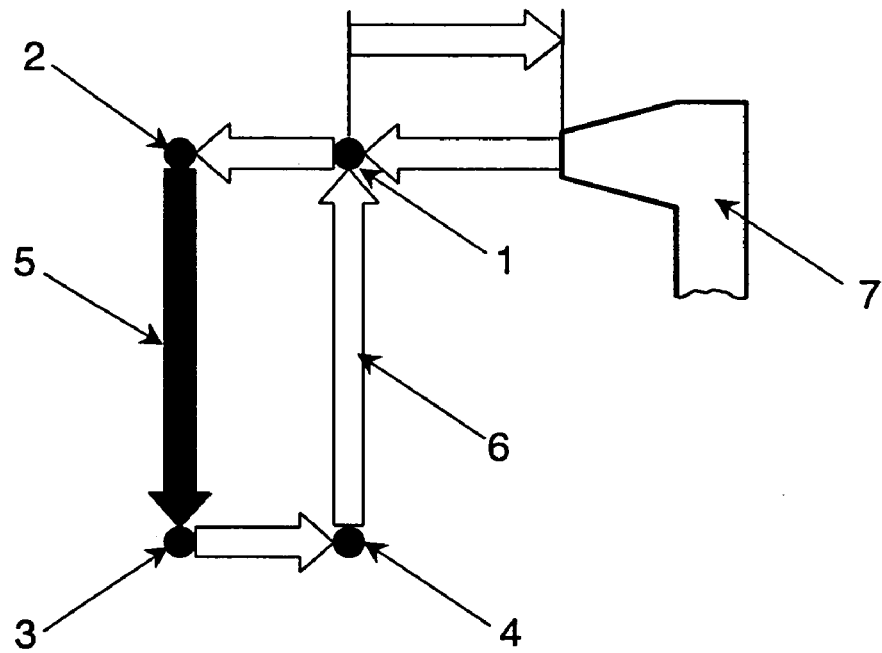

In FIG. 3, according to the state of the art, the cutter head 7 is moved out of a rest position at the beginning of production into a start position 1, in which an indexing procedure (a rotation of the workpiece around one tooth index), is also possible. A movement into the initial roll position 2, from which the generating 5, in this case the downward generating, is performed to produce a tooth space. Upon reaching the end position 3, the generating process is ended and the cutter head 7 is moved back into the position 4. Subsequently, a backward generating motion 6 up to the start position 1, the rotation of the workpiece around one tooth index, and the renewed sequence of the production of a tooth space described are performed. After producing all tooth spaces of the workpiece, the cutter head 7 is moved back into the rest position.

Figure 4:
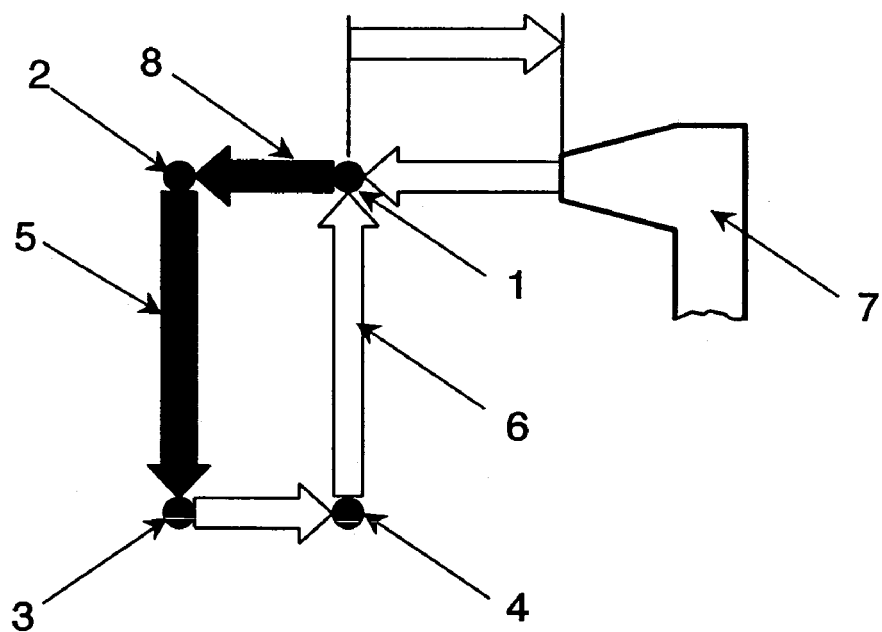

In the plunging generating process according to the related art shown in FIG. 4, the necessary distance for the generating 5 is shorter, which is indicated by the shorter arrow lengths. In this process, a motion of the cutter head 7 out of the rest position to the start position 1 is again performed, this is followed by the plunging process 8 into the workpiece. After reaching the full plunging depth and therefore the initial roll position 2, the plunging is ended and the generating 5 is started. Upon reaching the end position 3, the generating process is again ended and the cutter head is moved back into the start position 4. Subsequently, the backward generating motion 6 up to the start position 1, the rotation of the workpiece around one tooth index, and the production of subsequent tooth spaces according to the sequence described are then performed. After producing all tooth spaces of the workpiece, the cutter head 7 is moved back into the rest position.

Figure 5:
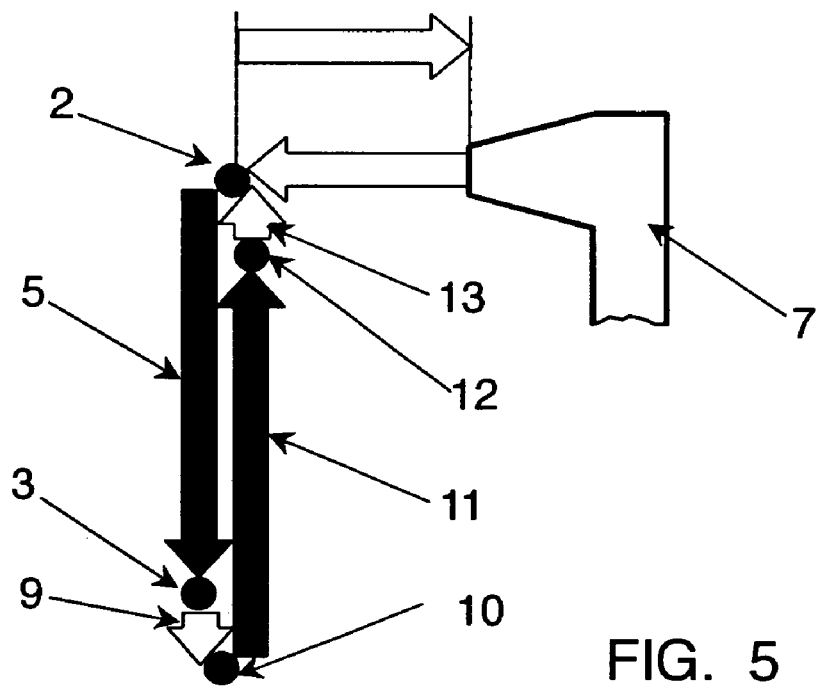

FIG. 5 shows a generating process according to the present invention, which is improved in relation to FIG. 3. Starting from the rest position, the cutter head 7 is immediately moved into the start position 2, from where the generating 5 begins. After reaching the generating end position 3, in which the last metal is removed, a first rapid generating motion 9 to completely leave the tooth space follows, using which the second start position 10 is reached. The workpiece is rotated here around one tooth index and then, by generating in the reverse direction 11 up to the second end roll position 12, a further tooth space is generated. A second rapid generating motion 13 follows at this point, in order to move the tool completely out of the tooth space again. With this second rapid generating motion 13, the initial roll position 2 is reached again, at which the next rotation of the workpiece around one tooth index and the further production of the tooth spaces according to the sequence described occurs. After production of all tooth spaces of the workpiece, the cutter head 7 is moved back into the rest position.

Figure 6:
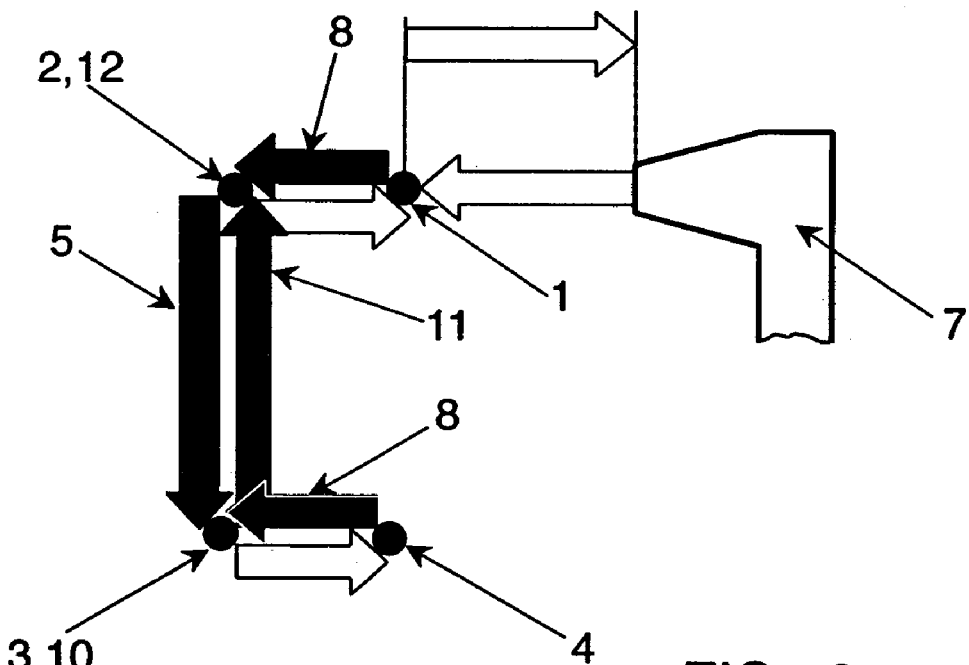

In the plunging generating process according to the present invention shown in FIG. 6, the distance necessary for the generating 5 and the generating 11 in the reverse direction is again less than for the process described in FIG. 5. Starting from the rest position, the cutter head 7 is moved into the start position 1, from where the plunging 8 into the workpiece occurs at advance speed. After reaching the initial roll position 2, the generating 5 for producing the tooth space starts. Upon reaching the generating end position 3, which simultaneously corresponds to the second initial roll position 10, the generating process is ended, and the cutter head 7 is moved up to the position 4. This is already followed here by the rotation of the workpiece around one tooth index. Subsequently, a plunging motion 8 into the workpiece is executed until reaching the second initial roll position 10, from which the next tooth space is produced by generating in the reverse direction 11. Upon reaching the second end roll position 12, which corresponds in this case to the initial roll position 2, the cutter head 7 is moved out of the tooth space to the start position 1. The rotation of the workpiece around one tooth index and the production of the following tooth spaces in the process described are then again performed. After production of all tooth spaces of the workpiece, the cutter head 7 is moved back into the rest position.

The processes illustrated in FIGS. 3 through 6 may also be performed using reversed roll directions, i.e., the generating 5 is not downward generating but rather upward generating and the backward generating motion 6 and/or generating in the reverse direction 11 is then downward generating. In this case, the start position, initial roll position, and end roll position would then also change.

Figure 7:
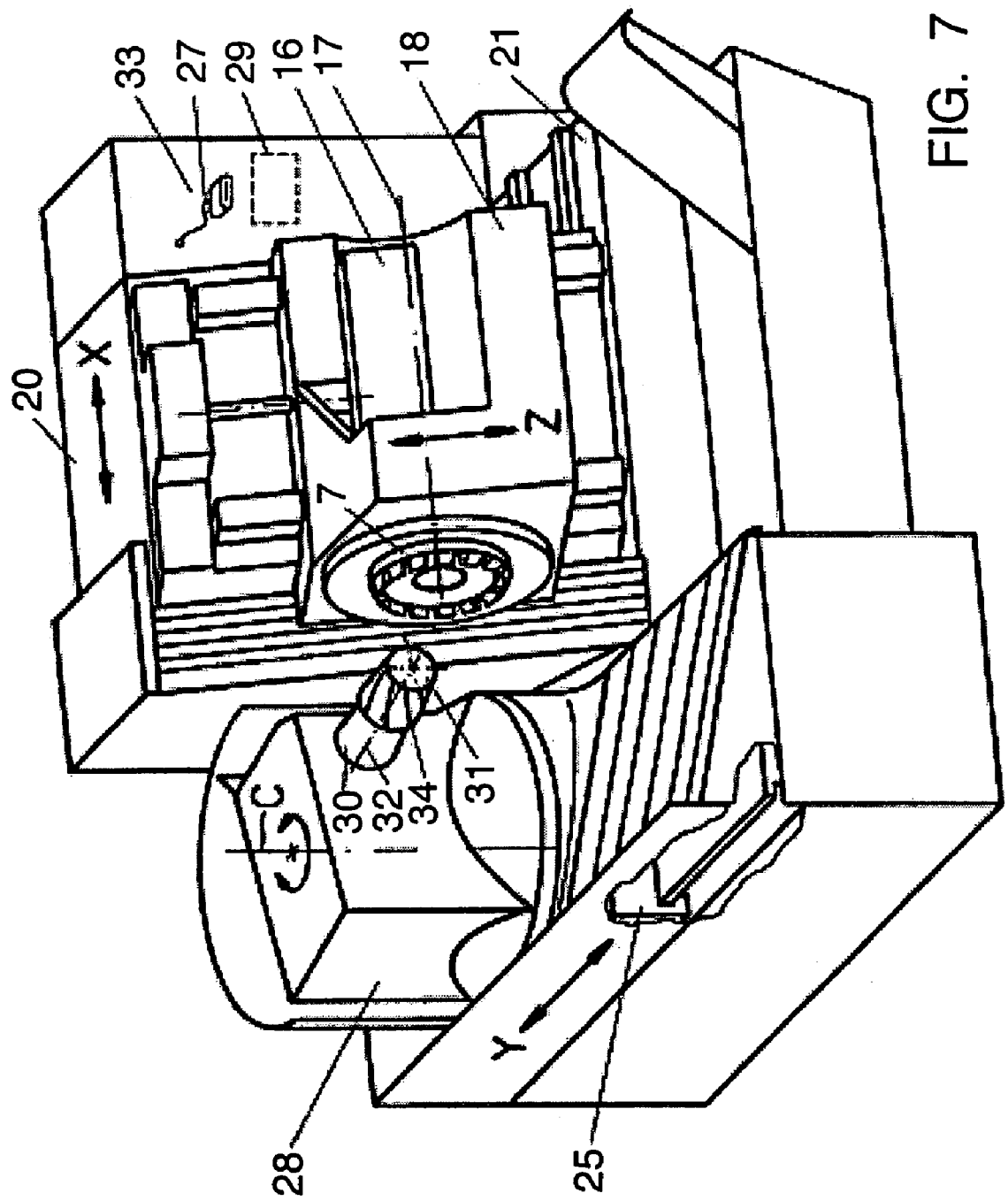
FIG. 7 shows a schematic illustration of a machine according to the present invention.

An example of a machine according to the present invention is shown in FIG. 7. Externally, it corresponds to the CNC machine for producing spiral bevel gears described in DE 196 46 189 C2, already cited. It has a drive motor 16 for rotating the cutter head 7 around its axis of rotation 17. Motor 16 and cutter head 7 are located on a first slide 18, which is guided laterally on a machine housing 20 and whose height is adjustable (parallel to the Z axis). The machine housing 20 is in turn horizontally movable (parallel to the X axis) on a machine base 21, on which a second slide 25 is also located. This second slide 25 supports a workpiece carrier 28, rotatable around a vertical axis C, having a workpiece spindle 30 and a workpiece 31, which is mounted in the workpiece carrier 28 so it is rotatable around a horizontal axis 32. The second slide 25 is also horizontally movable (parallel to the Y axis), but perpendicularly to the X axis of the machine housing 20 and to the Z axis of the first slide 18. These machine components therefore form the mechanical requirements for producing spiral bevel gears through a generating process in the single-indexing method. The decisive difference of this machine according to the present invention from a machine state of the art is an altered control means 29 of the CNC controller, which is housed in a control cabinet 33.

According to the state of the art, a conventional control means ensures that after a generating process, for example, in which the five axes X, Y, Z, C, and the workpiece axis 32 must execute a previously calculated coupled motion, the cutter head 7 and the workpiece 31 are returned from their end roll positions back to their particular start positions. In order not to lose coupling of the participating five axes, this return is typically performed in the backward generating motion 6 already described in FIG. 3, and after pulling the cutter head 7 out of a tooth space 34 just produced.

Using the altered control means 29 of the CNC controller according to the present invention, cutter head 7 and workpiece 31 may each be moved into a second start position near the end roll positions just reached instead of the backward generating motion, from where, after an indexing procedure, they process a complete tooth space 34 in a generating process using a reversed roll direction. In this way, they also reach their original start positions again, but not in idle, rather through a complete work cycle. In order to be able to achieve the same precision on the workpieces 31 in this case as with a typical CNC machine, an additional control means is preferably provided in the conventional CNC controller, using which a differing influence of the particular roll direction on the precision of the bevel gear (workpiece) may be compensated for before and/or during each generating process. This additional control means may form an altered control means 29 together with the conventional CNC controller. A data line 27 is provided on the machine shown in FIG. 7, on which corrected machine parameters may be transmitted to the altered control means 29 separately for both roll directions. The corrected machine parameters may, for example, be supplied by an external computer. The altered control means 29 differs from conventional control means in that, among other things, it is capable of executing the method according to the present invention in such a way that the generating process is performed in a first direction and then a generating process is executed in the reverse direction. In this case, differing corrections of the setting parameters are used during the generating process in one direction and during the generating process in the reverse direction.

What is claimed is:

1. A method for machining spiral bevel gears comprising the steps of:
   a) moving a rotationally symmetric tool and a workpiece into respective first start positions;
   b) processing a first complete tooth space through a generating process using a first roll direction at a preset generating depth, the tool and the workpiece each reaching a first end roll position;
   c) moving the tool and the workpiece into respective second start positions near the previously reached first end roll positions;
   d) rotating the workpiece around a tooth index;
   e) processing a second complete tooth space through a generating process using a roll direction reversed in relation to the first roll direction, the tool and the workpiece each reaching a second end roll position near the first start positions;
   f) moving the tool and the workpiece to the respective first start positions;
   g) rotating the workpiece around said tooth index; and
   h) repeating steps b)–g) for processing additional complete tooth spaces until all tooth spaces of the workpiece have been processed.

2. The method according to claim 1, wherein the respective first start positions correspond to initial roll positions of the tool and workpiece in which the tool has reached the preset generating depth in relation to the workpiece.

3. The method according to claim 1 further comprising:
   moving at least one of the tool and the workpiece from its respective first start position to an initial roll position; and
   concurrent with said movement to the initial roll position, carrying out a selected one of a plunging process and a combined plunging/generating process into a tooth space to be produced or a pre-processed tooth space.

4. The method according to claim 1 further comprising:
   correcting at least one machine parameter before and/or during each generating process to compensate for an influence of the associated roll direction on the precision of the workpiece.

5. The method according to claim 4 further comprising:
   detecting said influence of the roll direction on the workpiece through topography measurements of representative tooth spaces of one and/or the other roll direction.

6. The method according to claim 5 further comprising:
   separately calculating corrected machine parameters for both roll directions from averaged data of the topography measurements.

* * * * *